May 5, 1942. E. A. DOOGAN 2,282,039
INDICATING CYLINDER
Filed Oct. 23, 1939 2 Sheets-Sheet 1
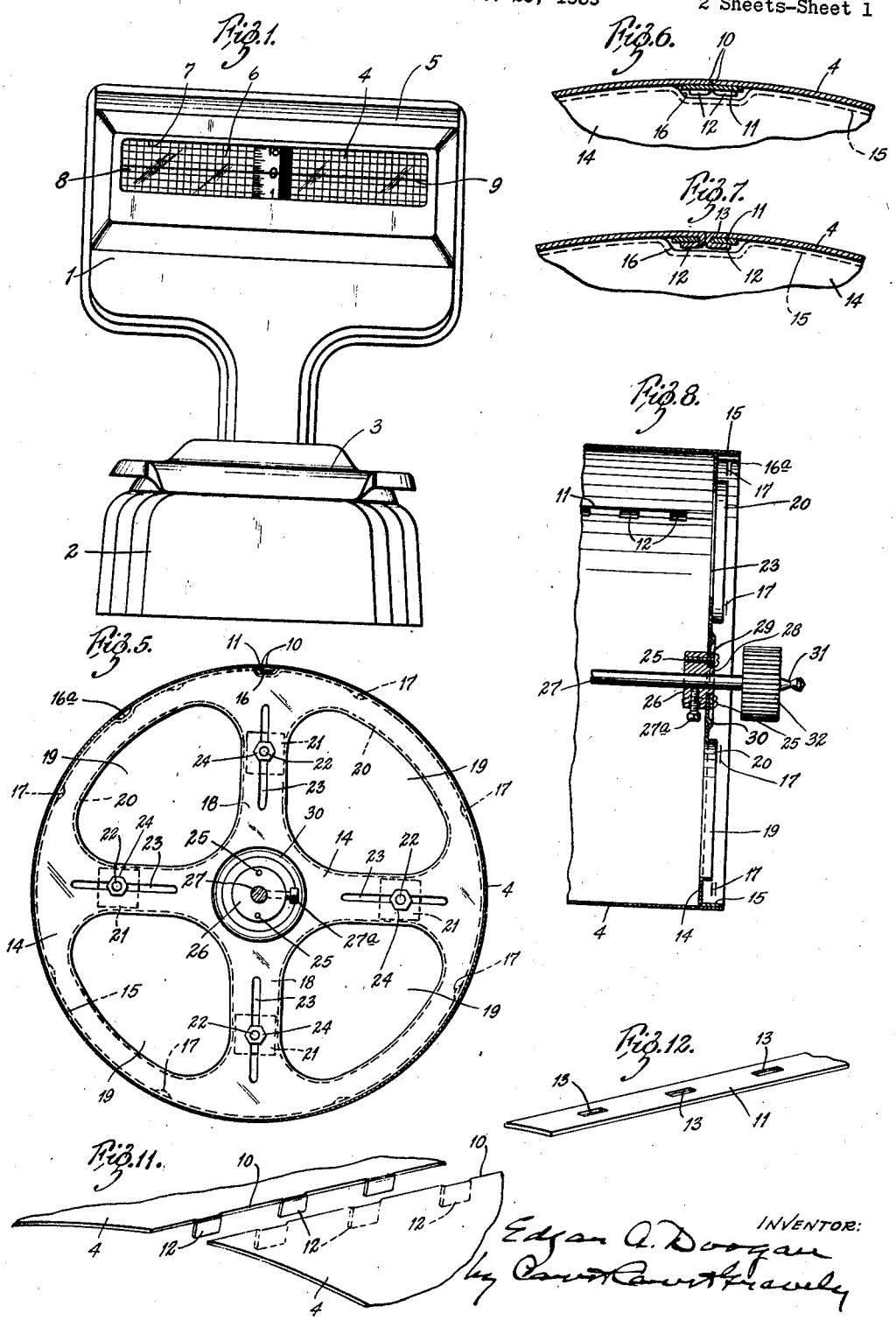

May 5, 1942.　　　　E. A. DOOGAN　　　　2,282,039
INDICATING CYLINDER
Filed Oct. 23, 1939　　　　2 Sheets-Sheet 2
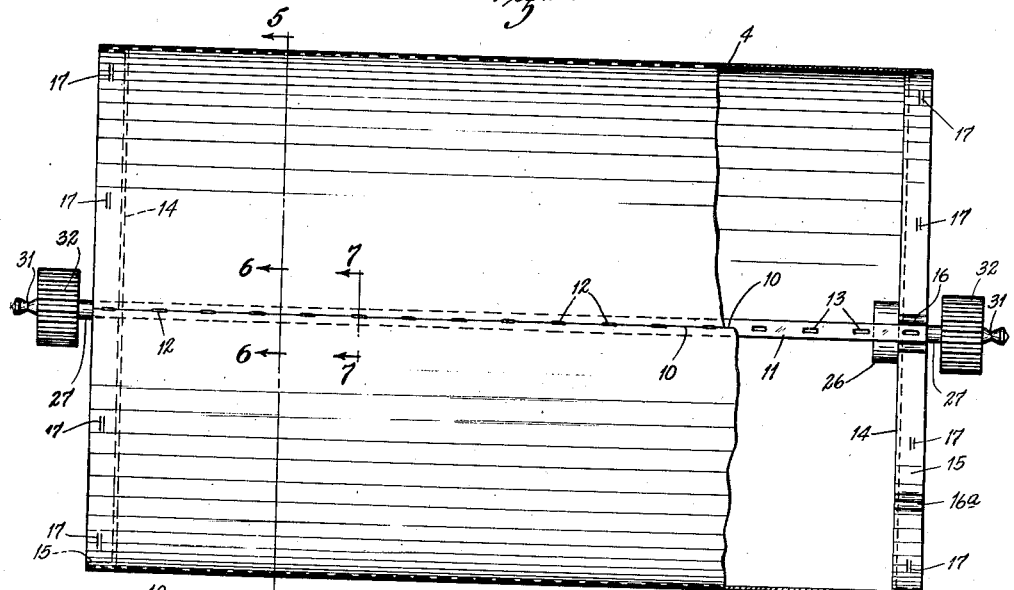
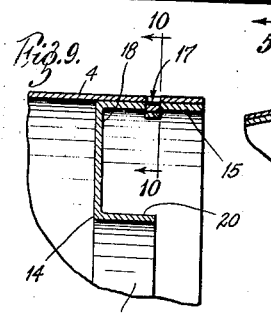
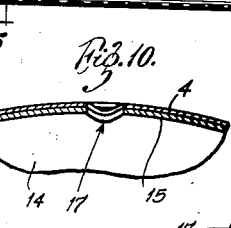
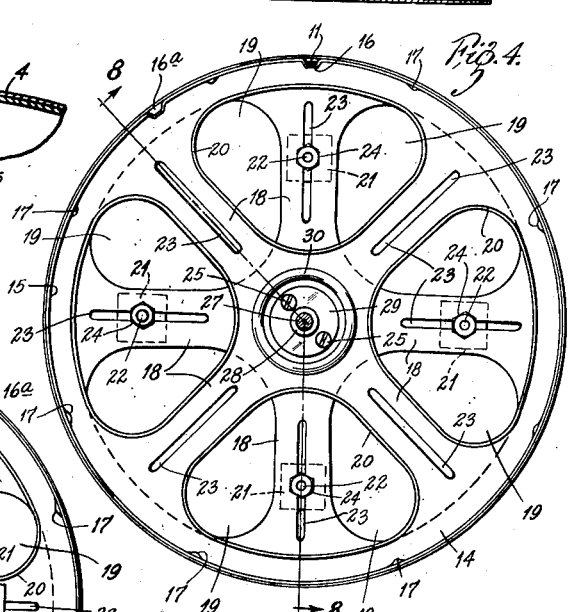
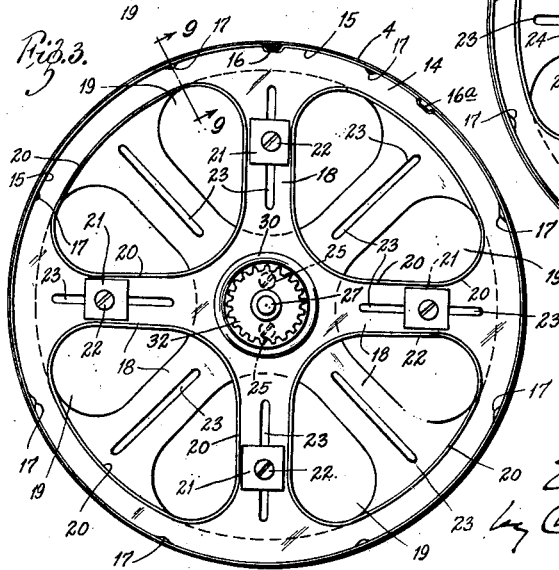
INVENTOR:
Edgar A. Doogan
HIS ATTORNEYS.

Patented May 5, 1942

2,282,039

UNITED STATES PATENT OFFICE 2,282,039

INDICATING CYLINDER

Edgar A. Doogan, St. Louis, Mo., assignor to Hussmann-Ligonier Company, St. Louis, Mo., a corporation of Missouri Application October 23, 1939, Serial No. 300,805

4 Claims. (Cl. 116—129)

This invention relates to weighing scales of the kind having a rotary indicating cylinder or drum responsive to the load applied. The principal objects of the present invention are to devise a simple and economical lightweight hollow indicating cylinder that is truly cylindrical and has a strong and rigid longitudinal joint flush with the outer periphery of said cylinder, and to provide supporting end frames or spiders for said cylinders which will assist in statically balancing said cylinder. The invention consists in the improved butt-joint construction for said cylinder, in the shape and arrangement of the frames or spiders for supporting the ends of said cylinders, and in the improved means for securing the indicating cylinder to the end spiders therefor.

In the accompanying drawings, which form part of this specification and wherein like symbols refer to like parts wherever they occur, Fig. 1 is a front elevation of a scale provided with a rotary indicating cylinder embodying my invention, Fig. 2 is a side elevation of the indicating cylinder, Fig. 3 is a view of one end of the indicating cylinder, Fig. 4 is an end elevation of the opposite end of the indicating cylinder, Fig. 5 is a cross-section through the indicating cylinder on the line 5—5 in Fig. 2, Figs. 6 and 7 are enlarged fragmentary cross-sectional views through the indicating cylinder in the region of the longitudinal butt-joint thereof on the lines 6—6 and 7—7, respectively, in Fig. 2, Fig. 8 is a central longitudinal section through one end of the indicating cylinder, Fig. 9 is an enlarged fragmentary longitudinal section through one end of the indicating cylinder on the line 9—9 in Fig. 3, showing the manner of fastening said end of said cylinder to the supporting spider therefor, Fig. 10 is a fragmentary section on the line 10—10 in Fig. 9, Fig. 11 is an enlarged fragmentary perspective view, showing the longitudinal edges of the wall of the indicating cylinder before they are secured together; and Fig. 12 is an enlarged fragmentary perspective view of the inside cover or butt strip for said edges.

In the accompanying drawings, my invention is shown embodied in a common type of weighing scale comprising a housing 1 having a base 2 on which a load holder or platform 3 is mounted. This platform is connected by any suitable load counterbalancing mechanism (not shown) to a horizontally rotatable drum or hollow cylinder 4 journaled in the upper or head portion 5 of the housing 1, said drum or hollow cylinder having a suitable indicating chart 6 on its outer surface. The head portion 5 of the housing 1 has an opening 7 therein provided with a glass cover 8, through which a portion of the chart 6 on the indicating cylinder 4 is exposed to view. Extending across the opening 7 is a fixed horizontal index wire or line 9 that cooperates with the chart 6 to indicate the weight or both weight and value of the article or material supported on the platform 3. The construction of weighing scale thus far described is well known and it is considered unnecessary to illustrate it in detail.

The wall of the indicating drum or hollow cylinder 4 comprises a single rectangular sheet of aluminum or other light gage material rolled into a hollow cylinder with its longitudinal edges 10 disposed in edgewise abutting relation and secured together by an inside cover or joint strip 11 of aluminum or other suitable light gage material and with the chart indicia applied in any suitable manner to the exposed or outer peripheral surface of said cylinder. The abutting edges 10 of the cylinder wall have opposed longitudinally spaced tabs or extensions 12 that extend inwardly flush with said edges through openings or slots 13 provided therefor in the inside cover strip 11 and are thence bent beneath said cover strip against the underside thereof. The shape and spacing of the tabs 12 along the two abutting edges 10 of the cylinder wall are the same; and the tabs along one edge are disposed opposite the tabs along the other edge and opposite the slots 13 in the inside cover strip with two opposite tabs in each of said slots. By this arrangement, the hollow indicating cylinder is provided with a strong longitudinal butt-joint that is flush with the outer periphery of said cylinder.

Mounted in each end of the indicating cylinder is a frame work or spider 14 of aluminum or other suitable material. Each of these spiders has an outstanding circular rim flange 15 that has a snug fit in the hollow indicating cylinder and terminates flush with the end thereof and is pressed inwardly to form a recess or pocket 16 adapted to accommodate the inside cover strip 11 and the bent tabs 12 of the longitudinal butt-joint. The rim flange 15 of the spider is provided with an additional recess 16a similar to the recess 16 which provides a choice of positions for the butt-joint when the spider is secured in the hollow cylinder. At each end of the hollow indicating cylinder the wall thereof and the rim flange 15 of the spider 14 therein are pressed inwardly, as at 17, at circumferentially spaced intervals to prevent relative endwise and rotary movement of said cylinder and spider. Preferably, the pressing tool is of such character as to shear the metal along spaced circumferential lines and force the strip-like portions thus formed inwardly, with the strip struck from the drum disposed in the plane of the rim flange of the spider.

The central portion of each of the spiders is connected to the rim portion 15 thereof by a series of radially disposed equally spaced arms or spokes 18; and the openings 19 formed by said radial arms or spokes and rim portion of the spider are surrounded by strengthening and stiffening edge flanges 20 located on the inner faces of said spider. Mounted on the outer faces of the arms or spokes of one of the spiders are suitable counterbalancing weights 21 that are secured to the spokes for adjustment radially of the spider by means of screws 22 that extend through said weights and longitudinal slots 23 in said spokes and are threaded at their inner ends to receive nuts 24. The arms or spokes 18 of the spider at one end of the indicating cylinder are preferably disposed opposite the openings 19 between the spokes of the spider at the opposite end of said cylinder so as to assist in statically balancing said cylinder.

Secured to the inner face of each spider by means of screws 25 is an annular hub member 26 adapted to receive a supporting shaft 27 therefor which is rigidly secured thereto by means of a set screw 27a. The hub member 26 has a reduced end portion 28 that extends snugly through a central opening provided therefor in the spider; and the securing screws 25 for said hub member extend through an annular clamping plate 29, which surrounds the reduced end 28 of said hub member, and are threaded into said hub member. Each spider has an annular stiffening and strengthening rib 30 pressed therein adjacent to and concentric with its hub member 26. The shaft 27 has grooved end portions 31 that are rotatably supported in any suitable manner in the head portion 5 of the housing 1. A pinion 32 is pressfitted on each end of the shaft 27 and is adapted to be oscillated by the reciprocating motion of the weight responsive mechanism (not shown).

The hereinbefore described indicating cylinder has important advantages. The inwardly pressed portions of the indicating cylinder and rim flange of each spider prevent both relative rotary and endwise movement thereof. The contiguous edges of the wall of the indicating cylinder are firmly and rigidly secured together in flush alinement by the butt-joint so that the cylinder has a smooth, continuous uninterrupted truly cylindrical outer peripheral surface, thereby eliminating any breaks or offsets in the chart on said cylinder and permitting the index line of the scale to be located close to the chart and thus eliminate errors in reading due to parallax. The two end spiders support the indicating cylinder and maintain the cylindrical form thereof; and the staggering or offsetting of the arms of one end spider with relation to the other end spider serves to strengthen said cylinder and eliminates the necessity for a third spider for supporting the cylinder intermediate to the ends thereof. This staggering or offsetting of the arms of the two spiders also tends to assist the counterbalancing weights in statically balancing the cylinder.

What I claim is:
1. A rotary indicator for weighing scales comprising a sheet of thin material rolled into a hollow cylinder of large diameter with its longitudinal margins flush with the periphery of said cylinder and disposed in edgewise abutting relation, and a separate cover strip located inside said hollow cylinder opposite said abutting margins, said strip having a series of longitudinally spaced slots extending therethrough, and said abutting margins having inwardly bent longitudinally spaced tabs thereon whose outer faces are flush with their associated margins and which extend through and are anchored in said slots.

2. A rotary indicator for weighing scales comprising a sheet of thin metal rolled into a hollow cylinder of large diameter with its longitudinal margins flush with the periphery of said cylinder and disposed in edgewise abutting relation, and a metal cover strip located inside said hollow cylinder and overlapping said abutting margins, said strip having a series of longitudinally spaced slots extending therethrough along said abutting margins, and said abutting margins having a corresponding series of inwardly bent oppositely disposed tabs thereon whose outer faces are flush with their associated margins and which extend through said slots and are bent beneath said strip against the inner face thereof each of said tabs having a width substantially equal to the length of a slot and each two opposed tabs having a combined thickness substantially equal to the width of a slot.

3. A rotary indicator for weighing scales comprising a sheet of material rolled into a hollow cylinder with its longitudinal margins flush with the periphery of said cylinder and disposed in edgewise abutting relation, and a cover strip located inside said hollow cylinder opposite said abutting margins, said strip having a series of longitudinally spaced slots extending therethrough opposite said abutting margins and said abutting margins having inwardly bent longitudinally spaced tabs thereon whose outer faces are flush with their associated margins and which extend through said slots and are equal in width to the length thereof and are bent beneath said strip against the inner face thereof, the tabs along one of said margins being disposed directly opposite the tabs along the other of said margins and opposite the slots in said cover strip with two opposite tabs disposed in face to face abutting relation in each of said slots.

4. A rotary indicator for weighing scales comprising a sheet of material rolled into a hollow cylinder with its longitudinal margins flush with the periphery of said cylinder and disposed in edgewise abutting relation, a cover strip located inside said hollow cylinder for securing together said abutting edges, and duplicate supporting spiders for the ends of said hollow cylinder, each of said spiders having spokes and a cylindrical rim portion that snugly fits within the end of said cylinder and has at least two circumferentially spaced pockets either of which may accommodate said cover strip, the circumferential spacing of said pockets being such that when said cover strip is seated in a different pocket in each of said spiders the spokes of the spider at one end of said cylinder will be offset circumferentially with respect to the spokes of the spider at the other end of said cylinder.

EDGAR A. DOOGAN.